Nov. 22, 1955 A. F. KLINZING 2,724,488
BARN CLEANER CHAIN, FLIGHT AND GUIDE ASSEMBLAGE
Filed Aug. 9, 1952
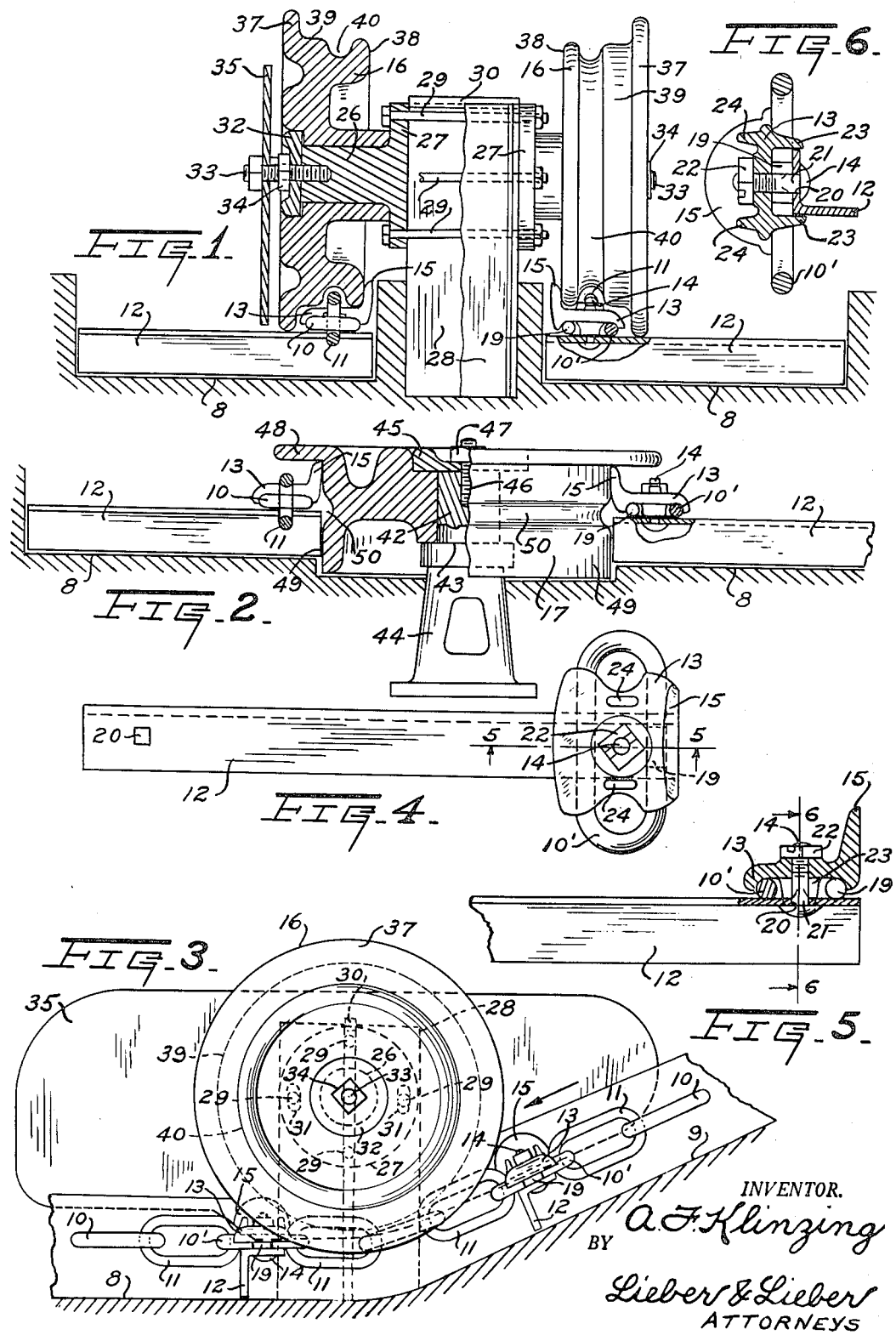
INVENTOR.
A. F. Klinzing
BY
Lieber & Lieber
ATTORNEYS

2,724,488

BARN CLEANER CHAIN, FLIGHT AND GUIDE ASSEMBLAGE

August F. Klinzing, Milwaukee, Wis.

Application August 9, 1952, Serial No. 303,510

14 Claims. (Cl. 198—171)

The present invention relates generally to improvements in the art of transporting bulk materials along definite paths, and relates more particularly to improvements in the construction and operation of chain, flight and guide assemblages for barn gutter cleaners or the like.

The primary object of my present invention is to provide various improvements in the construction of chain and flight conveyors for bulk material, whereby the structure and installation of such conveyors is simplified and the flights are properly guided and retained in most effective travelling position during normal operation.

It has heretofore been common practice to remove animal refuse and litter from barns and stables by utilizing a chain conveyor carrying a series of flights movable along a catch trough or gutter to transport the materials to a suitable outlet usually located at an end of the animal enclosure and above the floor thereof. Because of the tacky nature of the bulk material handled by these conveyors and also due to the fact that the chains and flights must travel around bends and along relatively inclined stretches of the gutters, it is impossible with the prior simple chain, flight and guide assemblages to make the flights travel in proper position along the gutters especially at the direction changing localities. It is moreover necessary with the prior chain type barn cleaners to handle elongated and heavy chain sections when installing or removing the conveyors, and it is also difficult to firmly attach or to effect quick removal of the flights of these prior devices. Then too, most of the previous barn gutter cleaners endanger the animals, and many of them are too complicated and costly to install and to maintain in operating condition.

It is therefore an important object of my invention to provide a barn gutter cleaner of the chain and flight conveyor type, which obviates all of the above mentioned objectionable features inherent in the prior cleaners.

Another important object of this invention is to provide an improved chain and flight guiding assemblage for barn gutter cleaners or the like, which is simple, compact and durable in construction, and which is also effectively and safely operable.

A further important object of the invention is to provide an improved attachment for firmly securing the conveying flights to selected links of a conveyor chain, and for permitting convenient installation or removal of elongated chains in relatively short sections.

Still another important object of my present invention is to provide improved rotary guide wheels for maintaining the flights of a conveyor chain in proper position relative to the troughs or gutters with which these flights coöperate, whenever the direction of travel of the flight carrying chain necessarily changes.

An additional object of the invention is to provide various improvements in the construction and operation of chain and flight conveyors whereby they may be manufactured and installed at moderate cost for diverse uses.

These and other objects and advantages of this invention will be apparent from the following detailed description from which it will be noted that the gist of the improvement is the provision of a simple and durable flight attaching clamp formed for cooperation with horizontal and vertical guide wheels to constantly maintain the flights in horizontal position and perpendicular to the conveyor chain, and wherein the clamps also function to permit convenient installation or removal of the chain in short sections.

A clear conception of the features constituting the present improvement, and of the construction and operation of a typical barn gutter cleaner embodying the same, may be had by referring to the drawing accompanying and forming a part of this specification wherein like reference characters designate the same or similar parts in the various views.

Fig. 1 is a part sectional side view of a pair of vertical chain and flight guiding wheels rotatable about a common horizontal axis and coacting with the forward and return runs of an endless barn gutter cleaning conveyor at relatively inclined stretches of the gutter, the section having been taken centrally and vertically through one of the wheels and across the chain and gutters;

Fig. 2 is a part sectional side view of a single horizontal chain and flight guiding wheel rotatable about a vertical axis and adapted to coact with a horizontal bend in the conveyor chain, the section also having been taken centrally and vertically through the guide wheel and across the chain and gutters;

Fig. 3 is an end view of the assemblage of Fig. 1, looking toward the left and toward the return run of the chain at relatively inclined portions of the gutters;

Fig. 4 is an enlarged top view of one of the conveyor flights and its carrying link and clamp;

Fig. 5 is a similarly enlarged fragmentary vertical section through the assemblage of Fig. 4, taken along the line 5—5; and Fig. 6 is a likewise enlarged vertical section through the same assemblage, the section having been taken along the line 6—6 of Fig. 5.

While the improvements have been shown and described herein as being advantageously applicable to barn gutter cleaners of the endless conveyor chain type having curved and inclined gutter portions, it is not intended to unnecessarily restrict all of the improved features to such limited usage; and it is also contemplated that specific descriptive terms employed herein be given the broadest possible interpretation consistent with the disclosure.

Referring to the drawing, the typical barn gutter cleaner shown therein, comprises in general an elongated gutter having parallel horizontal stretches 8 connected by bends and located adjacent to the stalls in which the animals are housed, and also having forward and return parallel inclined portions 9 extending away from the corresponding ends of the stretches 8 toward a refuse outlet in one wall of the barn; an endless conveyor chain formed of a series of horizontal loop-shaped links 10 and an intervening series of similar vertical links 11, the chain being movable along the adjacent sides of the gutter stretches 8 and portions 9 in opposite directions by means of a well known driving sprocket coacting with a return bend thereof; flights 12 coacting with the undersides of selected special horizontal links 10' of the chain and extending laterally of the latter across and in close proximity to the bottom of the gutter; a clamp 13 and bolt 14 for firmly attaching each flight 12 to its carrying link 10', and having thereon an integral upwardly projecting flange 15; a pair of similar vertical guide wheels 16 rotatable about a common horizontal axis above the junction of the gutter stretches 8 and portions 9, and being cooperable with the vertical chain links 11, flights 12, and clamp flanges 15 to guide the chain and to maintain the flights 12 in horizontal position while changing their direction of advancement; and one or more horizontal guide wheels 17 rotatable about vertical axes at bends in the gutter, and being likewise cooperable with the conveyor elements to guide the chain and to maintain the flights 12 in horizontal position while travelling about these bends.

The gutter construction and the chain driving mechanism are old and well known in the art, and the present invention is therefore confined to the improved construction and operation of the chain, flights 12, clamps 13, and guide wheels 16, 17. The links 10, 11 of the conveyor chain are preferably formed of heavy metal rod stock, and each of the special horizontal flight carrying links 10' has a gap 19 in one side thereof through which the adjoining vertical links 11 may be passed in order to assemble or dismantle the chain. As shown, each fourth link 10' is of such special construction, so that when performing such assembly or dismantling operation the operator need only handle relatively few links of the chain at a time.

The flights 12 are preferably constructed of equal length from standard angle iron stock, and should be disposed perpendicular to the conveyor chain with their upper flanges rigidly attached to the under sides of their carrying links 10'. In order to permit reversal of the flights 12, each end portion of the upper flange of each flight is provided with a square hole 20 adapted to receive the square shank portions 21 of the clamping bolts 14, as shown in Figs. 5 and 6; and each of these bolts 14 also has a clamping nut 22 cooperable therewith and with the adjacent clamp 13. The clamps 13 are formed of sturdy castings, and besides the upper flanges 15, each clamp is provided with integral depending lugs 23 which snugly engage the opposite edges of the top flange of the adjacent flight 12, and with integral upper nut protecting lugs 24 disposed forwardly and rearwardly of the intervening nut 22. The clamps 13 are also shaped to cover the gaps 19 in the links 10 and to hug the opposite sides of these links when in clamping position, thus providing sturdy attachments for the flights 12; and the upwardly directed integral flanges 15 of the clamps 13 are slidably cooperable with the adjacent side surface of the gutter so as to prevent excessive tilting of the advancing flights away from the gutter bottom, see Fig. 6.

The similar but reversely positioned guide vertical wheels 16 are rotatable about alined shafts 26 having adjacent flanges 27 which are clamped against two upright channel irons 28 disposed back to back and which are firmly embedded within the foundation between the parallel gutters, by means of bolts 29. The channel irons 28 are spaced apart sufficiently to permit the upper and lower bolts 29 to pass therebetween, by a spacer 30, and are provided with slots 31 through which the other two bolts 29 extend as shown in Fig. 3, so that the wheels 16 and shafts 26 may be raised or lowered to properly position the conveyor with respect to the gutter. The wheels 16 are freely rotatable about the shafts 26 and are held thereon by plates 32, studs 33, and nuts 34; and a guard plate 35 may be suspended from one of these studs 33 as in Figs. 1 and 3 and may be bent outwardly away from the adjacent gutter and over the conveyor chain at its leading end in order to protect the corresponding wheel 16 from the advancing litter.

Each of the vertical guide wheels 16 is provided with an outer peripheral flange 37, with an inner plane end surface 38 and with a cylindrical intervening peripheral surface 39 having a medial groove 40 therein. The flange 37 is of such diameter that it will just clear the advancing flights 12 of the conveyor, and the groove 40 coacts with the end surface 38 to provide an inner annular flange adapted to contact the flanges 15 of the advancing clamps 13, while the groove 39 is cooperable with the upper portions of the vertical links 11 of the advancing chain, as illustrated in Fig. 1. The successive flights 12 of the conveyor are thus positively prevented from sagging out of horizontal position while being transferred from the horizontal gutter stretch 8 to the inclined portion 9, and vice versa; while the clamp lugs 23 positively hold the flights 12 perpendicular to the conveying chain.

The horizontal guide wheel 17 is freely rotatable about an upright shaft 42 and upon a thrust bearing 43 carried by a pedestal 44 which is fixedly embedded in the floor as shown in Fig. 2, and the wheel 17 is detachably retained upon the shaft 42 by a plate 45, stud 46 and nut 47. The upper end of the guide wheel 17 is provided with a peripheral flange 48, while the lower portion of this wheel has a cylindrical peripheral surface 49 provided with an annular groove 50. The upper flange 48 of the guide wheel 17 is preferably of sufficient width that it will substantially cover the conveying chain and the clamps 13, and the successive clamp flanges 15 are cooperable with this flange 48 and with the surface 49 so as to prevent undesirable sagging of the flights 12 as they travel about the bends in the gutter, while the grooves 50 provide clearance for the links 10 and for the successive clamping elements.

When the various parts of the improved barn gutter cleaner have been properly constructed as above described, and the guide wheels 16, 17 have been properly positioned with respect to the gutter inclines and bends, the endless conveyor chain may be readily assembled by hooking up successive four link sections with the aid of the gaps 19 in the special links 10', and with minimum slack in the entire chain. The successive flights 12 may thereafter be readily firmly secured to the successive links 10' with the aid of the clamps 13 so as to cover and conceal the gaps 19, and the lugs 23 of the clamps 13 will then firmly hold the flights 12 perpendicular to the chain. As the conveyor is advanced, the successive flights 12 will be advanced along the trough or gutter sections and about the vertical and horizontal bends while the guide wheels 16, 17 and the upwardly extending clamp flanges 15 will function to prevent undue sagging and tilting of these flights and will maintain them substantially parallel to the bottom of the gutter at all times. If it becomes desirable to remove the conveyor chain, it is only necessary to release one or more of the clamps 13, and the guide wheel flanges 37, 48 cooperate with the guard plate 35 to prevent litter from accumulating upon the wheels 16, 17 and to protect the animals from possible injury.

From the foregoing detailed description it will be apparent that the present invention in fact provides a simple but efficient barn gutter cleaner which can be readily installed and which also protects the animals to the utmost extent. The special chain links 10' facilitate assembly of the conveying chain, and the improved clamps 13 besides insuring firm attachment of the flights 12 also hold the successive chain sections together and aid in properly positioning and guiding the flights 12. The improved guide wheels 16, 17 most effectively guide the conveying chain around vertical and horizontal bends with minimum friction losses and with utmost safety, and also cooperate with the chain links and with the clamp flanges 15 to maintain the flights 12 in proper horizontal position. The improvements are obviously applicable to various types of chain conveyors of simple but durable construction, and have proven highly satisfactory and successful in actual use.

It should be understood that it is not desired to limit this invention to the exact details of construction or to the precise mode of operation of the endless chain barn gutter cleaner herein shown and described, for various modifications within the scope of the appended claims may occur to persons skilled in the art.

I claim:

1. In a barn gutter cleaner, a conveyor chain having a series of alternate vertical and horizontally disposed links, flights carried by selected horizontal links of said series and each having one free end extending laterally away from said chain and being movable thereby along the gutter, a clamp for firmly securing the opposite end of each of said flights to the adjacent horizontal link, each of said clamps having thereon a flange projecting upwardly away from said chain in approximately vertical alinement with said opposite end of the adjacent flight, and a guide wheel cooperable with said flanges and flights to maintain said flights within and parallel to the bottom of the gutter.

2. In a barn gutter cleaner, a conveyor chain having a series of flat alternate vertical and horizontal loop shaped links, flights carried by and coacting with the undersides of selected horizontal links of said series and each having one end extending laterally and downwardly away from the chain and being movable thereby along the gutter, a clamp coacting with the top of each of said selected chain links for firmly clamping the opposite end of the adjacent flight to the under-side of said link, each of said clamps having thereon an integral upwardly extending flange disposed perpendicular to the gutter bottom in approximately vertical alinement with said opposite end of the adjacent flight, and a guide wheel cooperable with the successive flanges and flights to maintain said flights within and parallel to the bottom of the gutter.

3. In a barn gutter cleaner, a conveyor chain having a series of flat horizontal loop shaped links and intervening similar vertical links, flights carried by selected horizontal links of said series and extending laterally of the chain, each of said selected links having an open gap at one side thereof for effecting removal of adjacent vertical links therethrough, and a clamp for firmly securing each of said flights to the bottom of the adjacent horizontal link and for normally covering the gap therein, each of said clamps having an integral upwardly extending flange slidably cooperable with a side surface of the gutter.

4. In a barn gutter cleaner, a conveyor chain having a series of flat horizontal loop shaped links and intervening similar vertical links, flights carried by selected horizontal links of said series and extending laterally of the chain, each of said selected links having an open gap at one side thereof for effecting removal of adjacent vertical links therethrough, and a clamp for firmly securing each of said flights to the adjacent horizontal link and for normally covering the gap therein, each of said clamps having integral lugs cooperable with opposite sides of the adjacent flight to maintain the latter perpendicular to its carrying link.

5. In a barn gutter cleaner, a conveyor chain having a series of flat horizontal loop shaped links and intervening similar vertical links, angle sectioned flights having upper flanges coacting with the bottoms of selected horizontal links of said series and extending laterally of the chain, each of said selected links having an open gap at one side thereof for effecting removal of adjacent vertical links therethrough, and a clamp coacting with the top of each of said selected links to firmly secure each of said flights to the adjacent horizontal link and for normally covering the gap therein, each of said clamps extending downwardly through and having therein a lower recess snugly coacting with the opposite sides of the adjacent flight to prevent lateral tilting of the latter.

6. In a barn gutter cleaner, a conveyor chain having a series of flat horizontal loop shaped links separated by intervening upright links, flights carried by selected links of said series and extending laterally away from the chain, each of said selected links having an open gap at one side thereof for effecting removal of adjacent upright links therethrough, and a clamp for firmly securing each of said flights to the adjacent link and for normally covering the gap therein, each of said clamps having an upwardly extending integral flange slidably cooperable with a side surface of the gutter and also having spaced downwardly extending integral lugs coacting with opposite edges of the adjacent flight.

7. In a barn gutter cleaner, a conveyor chain having a series of horizontally and vertically disposed links, flights carried by selected horizontal links of said series and extending laterally away from said chain and being movable thereby along the gutter, a clamp for firmly securing each of said flights to the adjacent link, each of said clamps having thereon a rigid upstanding flange projecting upwardly away from said chain, and a guide wheel having a cylindrical peripheral wall and an end flange cooperable with said clamp flanges and flights to maintain said flights parallel to the bottom of the gutter while the chain travels about the wheel.

8. In a barn gutter cleaner, a conveyor chain having a series of flat horizontal and vertical loop shaped links, flights carried by and having upper horizontal flanges coacting with the under-sides of selected horizontal links of said series and extending laterally away from the chain and being movable thereby along the gutter, a clamp coacting with the top of each of said selected chain links for firmly clamping the adjacent flight flange to the under-side of said link, each of said clamps having thereon an integral upstanding flange disposed perpendicular to the bottom of the gutter, and a guide wheel rotatable about an upright axis and having an annular upper flange cooperable with the successive clamp flanges and flights to maintain said flights parallel to the bottom of the gutter.

9. In a barn gutter cleaner, a conveyor chain having a series of horizontally disposed links and an intervening series of vertical links, flights carried by selected horizontal links of said series and extending laterally away from said chain and being movable thereby along the gutter, a clamp for firmly securing each of said flights to the bottom of the adjacent link, each of said clamps having thereon a flange projecting upwardly away from said chain, and a guide wheel rotatable about a horizontal axis and having spaced annular end flanges cooperable with said flights and with said clamp flanges to maintain said flights parallel to the bottom of the gutter and also having an annular groove between said end flanges for receiving said vertical links.

10. In a barn gutter cleaner, a conveyor chain having a series of flat horizontal loop shaped links and an intervening series of similar vertical links, flights carried by and coacting with the under-sides of selected horizontal links of said series and extending laterally and downwardly away from the chain and being movable thereby along the gutter, a clamp coacting with the top of each of said selected horizontal chain links for firmly clamping the adjacent flight to the under-side of said link, each of said clamps having thereon an integral flange disposed perpendicular to the gutter bottom, and a guide wheel having an annular end flange and a cylindrical peripheral wall cooperable with the successive clamp flanges and flights to maintain said flights parallel to the bottom of the gutter.

11. In a barn gutter cleaner, a conveyor chain having a series of horizontally and vertically disposed links, flights carried by selected horizontal links of said series and extending laterally away from said chain and being movable thereby along the gutter, a clamp for firmly securing each of said flights to the adjacent horizontal link, each of said clamps having thereon a flange projecting upwardly away from said chain, and a guide wheel having an annular end flange and a cylindrical peripheral surface cooperable with said clamp flanges and with the flights to maintain said flights parallel to the bottom of the gutter.

12. In a barn gutter cleaner, a conveyor chain having a series of flat horizontal and vertical loop shaped links, flights carried by and coacting with the undersides of selected horizontal links of said series and extending laterally away from the chain and being movable thereby along the gutter, a clamp coacting with the top of each of said selected horizontal chain links for firmly clamping the adjacent flight to the under-side of said link, each of said clamps having thereon an integral flange disposed perpendicular to the gutter bottom, and a guide wheel having an annular peripheral end flange and a cylindrical peripheral surface both cooperable with the successive clamp flanges and flights to maintain said flights parallel to the bottom of the gutter.

13. In a barn gutter clearner, an endless conveyor chain having a series of horizontal and vertical links pivotally interconnected to cause the tops of the vertical links to project upwardly above the tops of the adjacent horizontal links of the longitudinally advancing chain, flights carried by and coacting with the bottoms of selected horizontal links of the series and extending laterally away from the chain across the gutter, a clamp coacting with each of said selected links and with the adjacent flight, and a freely rotatable guide wheel having approximately cylindrical peripheral surfaces cooperable with the tops of the successive horizontal links and also having an annular peripheral groove cooperable with the upwardly projecting tops of the successive vertical links and with the successive clamps to prevent displacement of said flights laterally of the gutter.

14. In a barn gutter cleaner, an endless conveyor chain having a series of horizontal and vertical links pivotally interconnected to cause the tops of the vertical links to project upwardly above the tops of the adjacent horizontal links of the longitudinaly advancing chain, flights carried by and coacting with the bottoms of selected horizontal links of the series and extending laterally away from the chain across the gutter, a clamp coacting with each of said selected links and with the adjacent flight, and a freely rotatable guide wheel having an annular peripheral groove cooperable with the upwardly projecting tops of the successive vertical links and also having approximately cylindrical peripheral surfaces on the opposite sides of said groove cooperable with the tops of the successive horizontal links and with the successive clamps to prevent displacement of said flights laterally of the gutter.

References Cited in the file of this patent

UNITED STATES PATENTS

| | | |
|---|---|---|
| 391,223 | Berger | Oct. 16, 1888 |
| 620,371 | Sheldrick | Feb. 28, 1899 |
| 881,908 | Demarest | Mar. 17, 1908 |
| 1,527,145 | Litchfield et al. | Feb. 17, 1925 |
| 1,635,085 | Johnson | July 5, 1927 |
| 2,554,589 | Patz et al. | May 29, 1951 |
| 2,558,424 | Dretzke | June 26, 1951 |

FOREIGN PATENTS

| | | |
|---|---|---|
| 119,133 | Germany | Apr. 1, 1901 |